July 26, 1932.   R. ROS CASABLANCAS   1,868,968
MACHINE FOR THE MANUFACTURE OF WIRE NETTING
WITH HEXAGONAL MESHES OF VARIABLE WIDTH
Filed Dec. 27, 1930    9 Sheets-Sheet 1

Inventor
Rosa Ros Casablancas
per [signature]
Attorney

July 26, 1932.  R. ROS CASABLANCAS  1,868,968
MACHINE FOR THE MANUFACTURE OF WIRE NETTING
WITH HEXAGONAL MESHES OF VARIABLE WIDTH
Filed Dec. 27, 1930   9 Sheets-Sheet 2

FIG. 2.

Inventor
Rosa Ros Casablancas
per
Attorney

Patented July 26, 1932

1,868,968

UNITED STATES PATENT OFFICE

ROSA ROS CASABLANCAS, OF TARRASA, SPAIN

MACHINE FOR THE MANUFACTURE OF WIRE NETTING WITH HEXAGONAL MESHES OF VARIABLE WIDTH

Application filed December 27, 1930, Serial No. 505,042, and in Spain July 16, 1930.

My invention consists of a machine for the manufacture of hexagonal mesh wire netting, in which the width of the hexagonal meshes varies, so that in any row of meshes transversal to the length of the piece the meshes are not of the same width. These wire nettings of variable meshes are usually made in such manner that next to one of the longitudinal edges of the piece the meshes are narrower and widen towards the other edge, but other longitudinal zones of narrow meshes can also be arranged on the other edge of the piece or at intermediate points.

The netting of hexagonal meshes of variable width manufactured by the machine of my invention corresponds to the type of metal netting in which the class of twist which joins the wires varies alternately from one to another transversal row of meshes, so that, for example, in the even rows the twist is in a single direction, whereas in the odd rows, each joining is formed by two opposite twists.

Besides which, the machine of my invention facilitates the manufacture of this wire netting reinforced by a series of wires directed in the sense of the length of the netting and fixed by the twist of the wires forming the hexagonal meshes, which are divided in halves by said wires, thus obtaining a close-woven and strong netting.

The machine comprises essentially two horizontal rulers situated one over the other. The upper ruler carries a series of pinions radially slotted and moved by a rack, which pinions, in turning, give the wires the twist in two directions. The lower ruler contains the organs which impart to the wires the twist in a single direction, which organs consist of a series of revolving heads, likewise actioned by a rack.

These heads, as also the slotted pinions are distributed over the respective rulers, so that the distance between the two consecutive organs is not uniform but varies in the same proportion as the width of the meshes has to vary in the wire netting to be manufactured.

The machine also comprises means to make the metal wire netting advance periodically as it is being manufactured, and also means to suitably feed the wires which are to form the netting.

In the subjoined drawings is shown a form of execution of the machine of my invention, and of the wire netting manufactured by it.

Finally.

Figure 1:
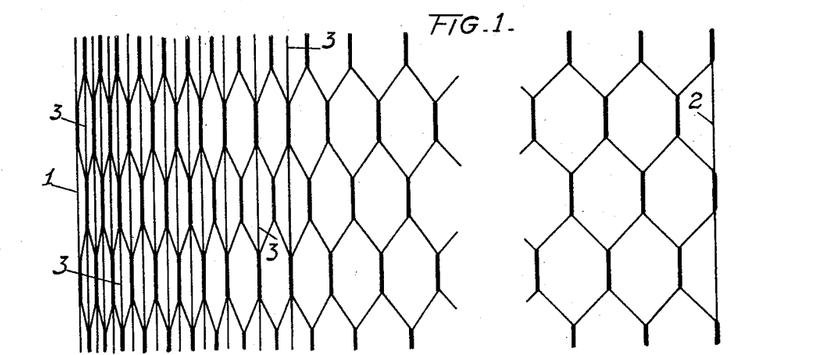
Fig. 1 represents a sample of the wire-netting of hexagonal meshes of variable width, in which the width of the meshes varies progressively from one end of the netting to the other.

In the wire netting with hexagonal meshes which is manufactured with the machine as shown in the drawings, the width of the meshes, as seen in Fig. 1, is not uniform, but in each transversal row it varies progressively from edge 1 of the netting corresponding to the right of the figure to the left edge 2, so that in this latter edge the width of the meshes is greater than on the right edge. This netting of progressive meshes can, if so desired, be reinforced by longitudinal straight wire joined by the twist formed by the hexagonal meshes, so that they divide the latter in half.

These strengthening wires 3 may be put in all the vertical rows of meshes, or only in some of them.

Figure 2:
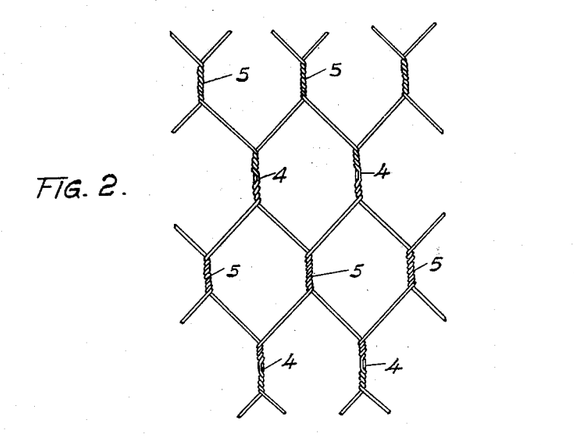
Fig. 2 is a detail on a larger scale, of the wire netting, representing the twist of the wires.
Figure 3:
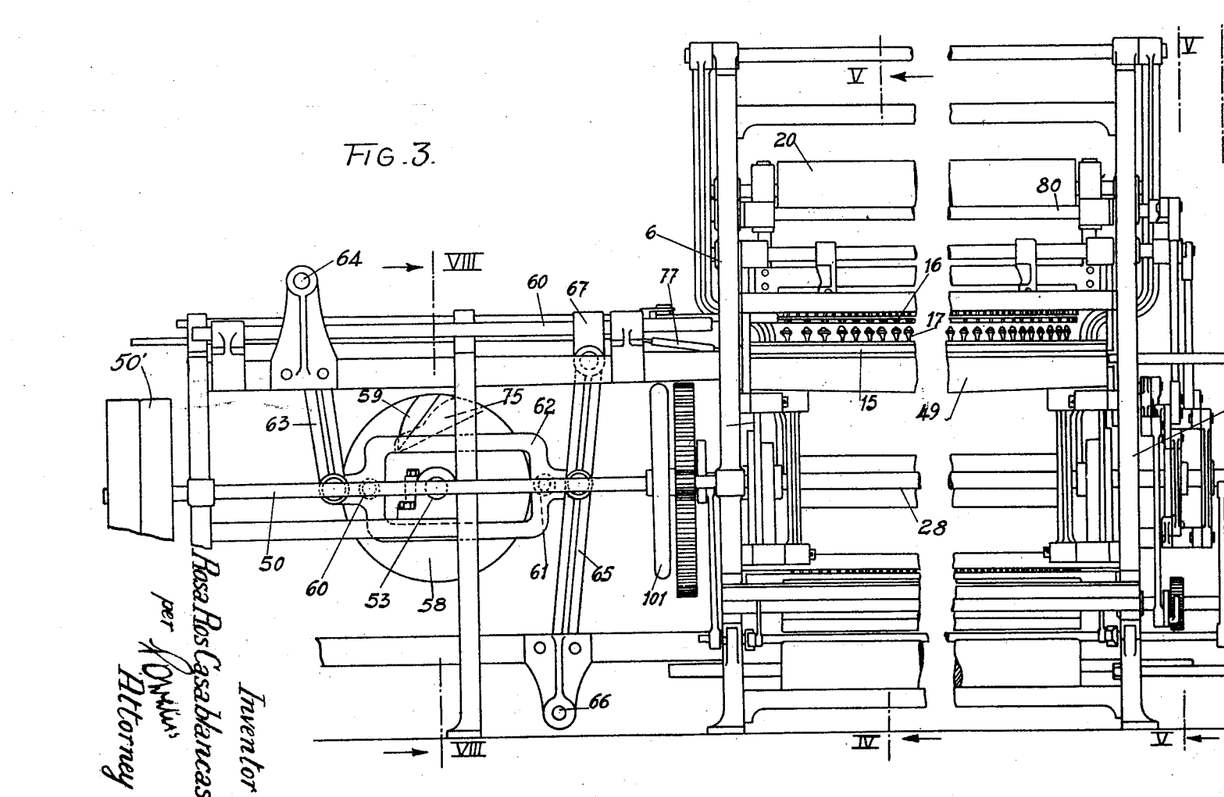
Fig. 3 is a front elevation of the machine.
Figure 4:
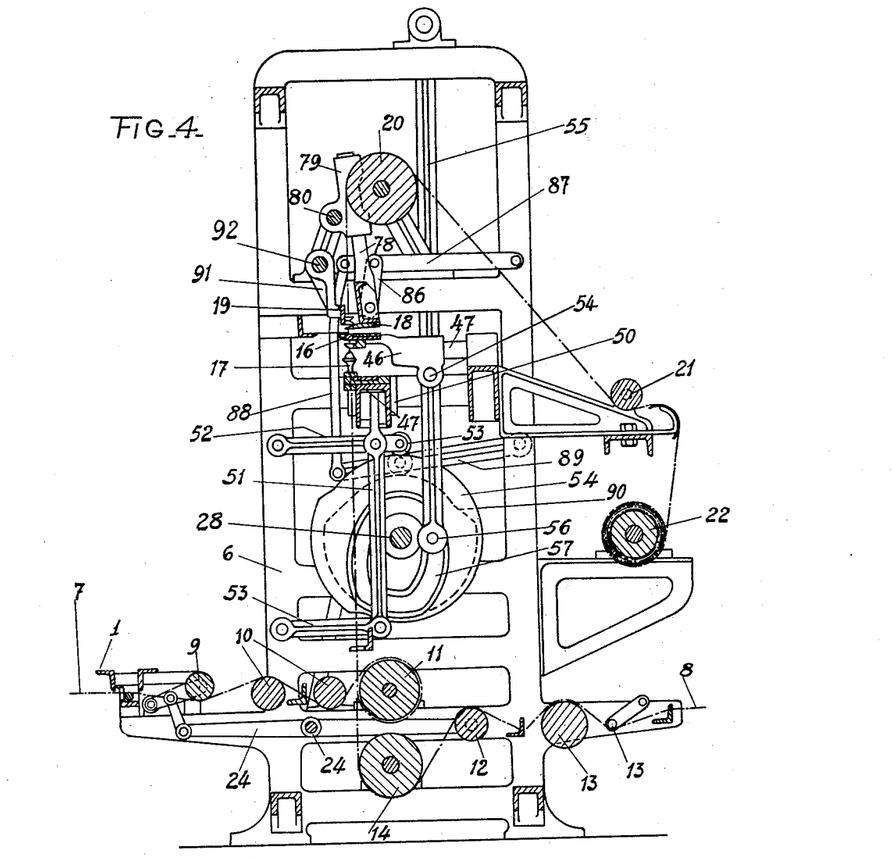
Figs. 4, 5 and 6 show transversal vertical sections, respectively at lines IV—IV, V—V and VI—VI of Fig. 3.
Figure 5:
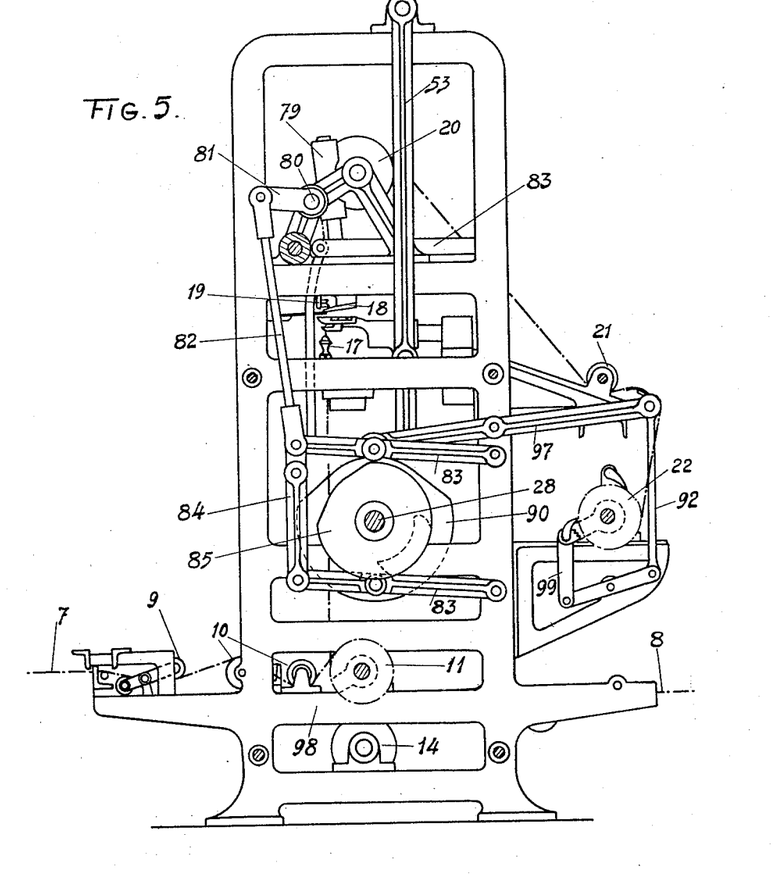
Figure 6:
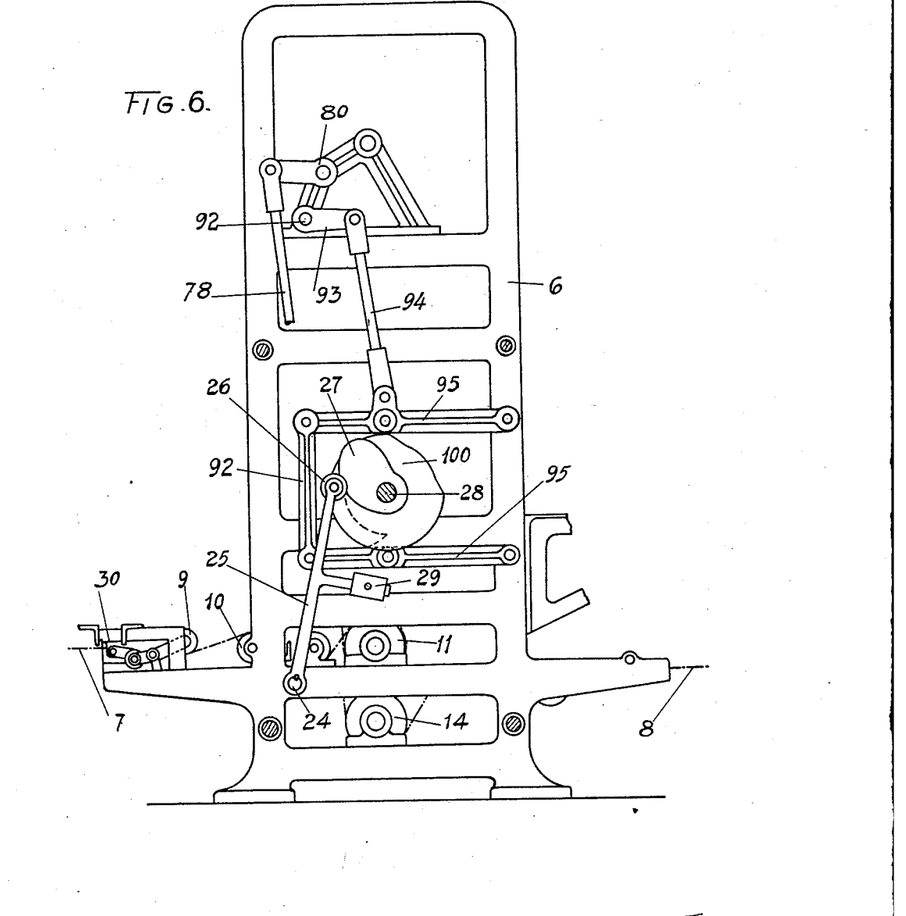
Figure 7:
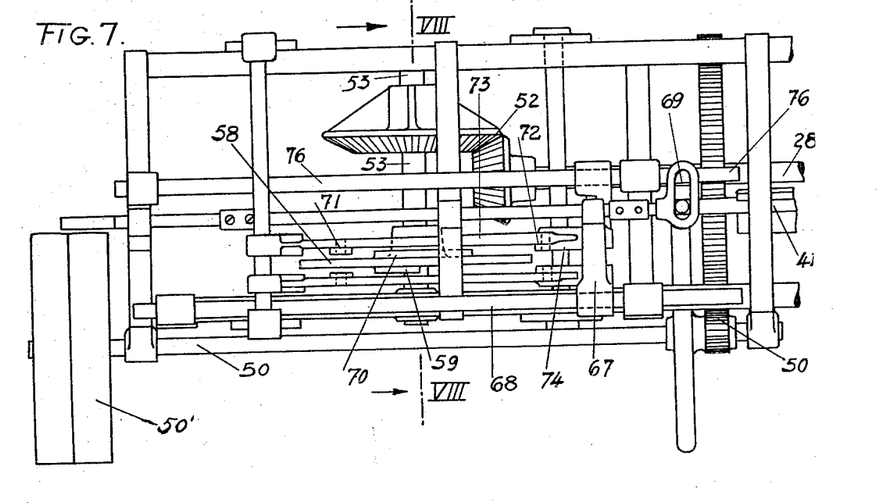
Fig. 7 is a plan view of the part of the machine with the mechanism which imparts motion to the racks actuating the twisting organs.
Figure 8:
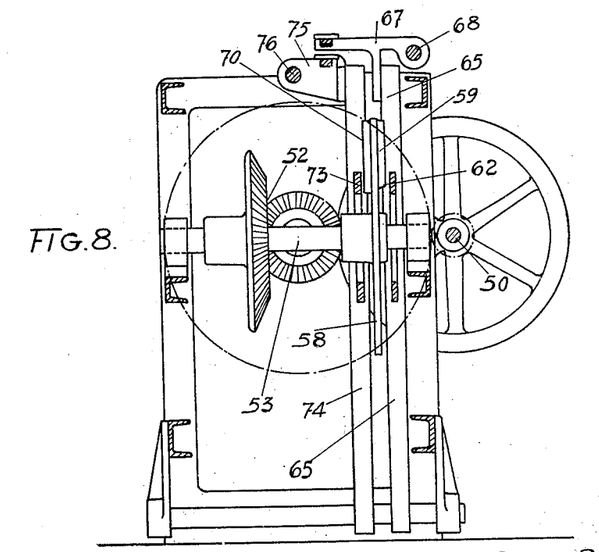
Fig. 8 is a vertical section, at line VIII—VIII of Figs. 7 and 3.
Figures 9, 10:
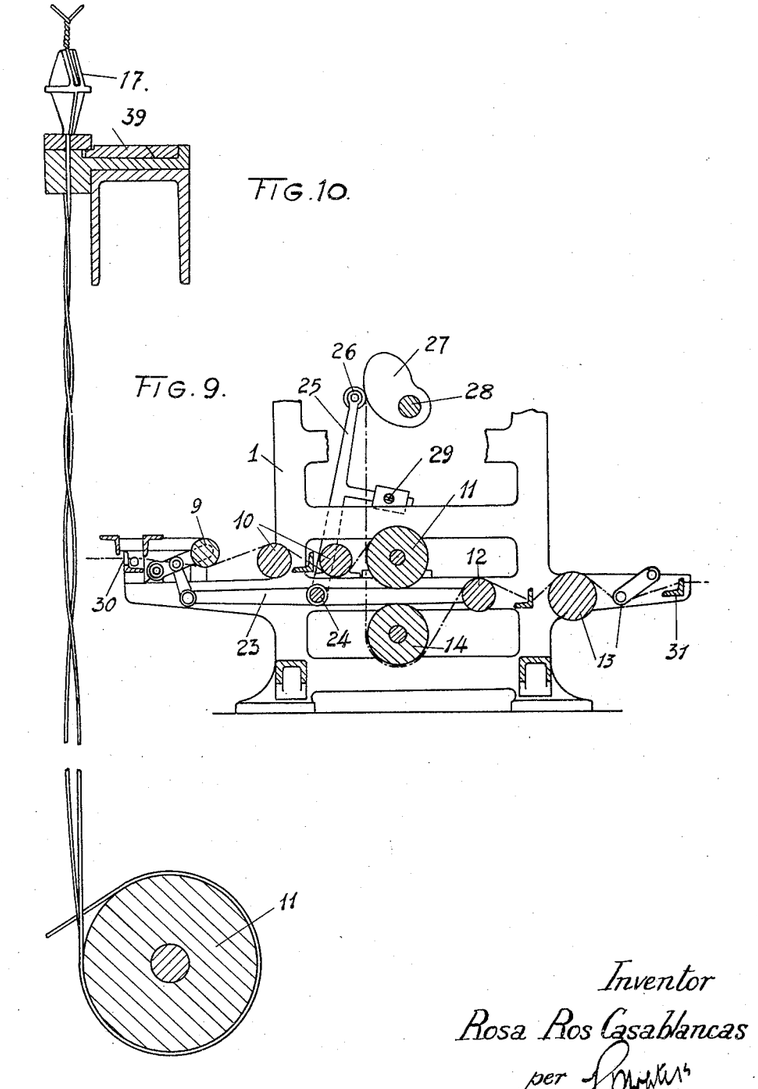
Fig. 9 is a diagram of the double set of tension and feeding rollers and mechanism for their working.
Fig. 10 is a detail view of the way of passing the wires from the feeder-rollers to the twisting organs.

The sort of twist which joins the wires in couples to form the meshes varies as shown in Fig. 2 alternately from a horizontal row to the next one, so that the twist, corresponding, for example to the even rows is in two opposite directions and the twist 5 in the odd rows is in one single direction.

The machine comprises, in its essential features, two feeding and tension mechanisms mounted on the base of the frame 6 of the machine, one on the outside which actuates on wires 7 destined to form, by twist, the hexagonal meshes, and another at the back for wires 8 which, fixed by the twist of the former serve to strengthen the netting. The front feed-mechanism comprises a tension roller 9, two intermediate guide rollers 10 and an end one 11 of a greater diameter. In like manner the back mechanism comprises a tension roller 12 and the guide rollers 13, 14, this last, which is the end, being of greater diameter.

To these feed-mechanisms follow, in ascending order, two horizontal rulers 15, 16, one situated under the other at the back of the machine, for which the lower ruler 15 serves as a support for a series of revolving heads 17 which impart to the wires from roller 11 the twist in a single direction and the upper roller 16 carries a series of radially slotted pinions situated corresponding to said heads 17 of the lower ruler and at a convenient distance from the same, these slotted pinions form the organs which impart the twist to the wires in both directions. Placed above these rulers bearing the twist organs, are other horizontal rulers 18, 19, these being provided with points which cause the netting being manufactured to advance towards roller 20 mounted on the upper part of the frame of the machine, the manufactured netting passing finally, guided by the intermediate roller 21 to be rolled on the folding-roller 22 mounted at the back of the frame.

The tension rollers 9 and 12 of the feed-mechanisms (Figs. 3, 4, 5 and 6) are moved simultaneously by two collateral balance-beams 23 which oscillate on a shaft 24, joined at its ends to frame 1 of the machine. These balance-beams 23 are joined to arms 25, each one applied by a terminal roller 26, by means of an adjustable counterweight 29, against a cam 27, fixed on to the motor shaft 28 of the machine, which will be detailed later.

The wires which are to make the netting coming from spools not shown on the drawings, pass through the distributing combs 30 and 31, and the central rollers 11 and 14 which guide them upwardly towards the revolving twisting mechanisms mounted on rulers 15 and 16.

Between combs 30 and 31 and the central rollers 11 and 14 the wires are guided by the tension rollers 9, 12. Tension roller 12 is borne upon a lever 24 which is connected by linkage at one end indirectly with the roller 9 and is pivotally mounted on the frame 6 at 24′.

The form and working of the twisting organs will easily be understood on examining Figs. 10 to 15.

Figures 12, 13:
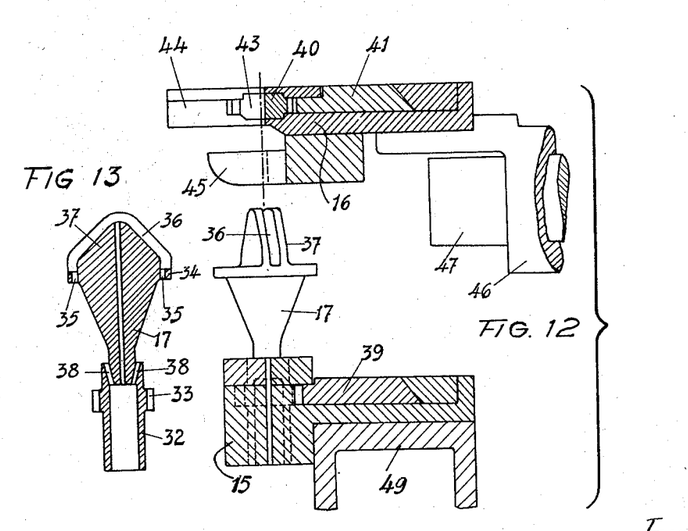
Fig. 12 is a transverse vertical section at line XII—XII of Fig. 11.
Fig. 13 shows a detail in axial vertical section of one of the revolving heads which twist in a single direction.
Figure 14:
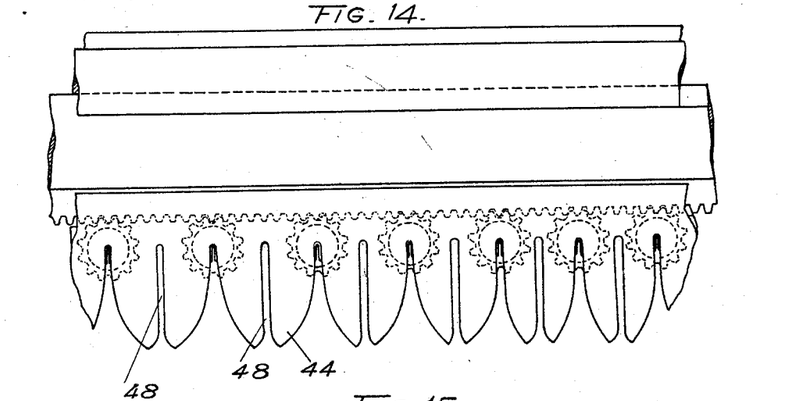
Figs. 14 and 15 are two horizontal sections at lines XIV—XIV and XV—XV respectively of Fig. 11.
Figure 15:
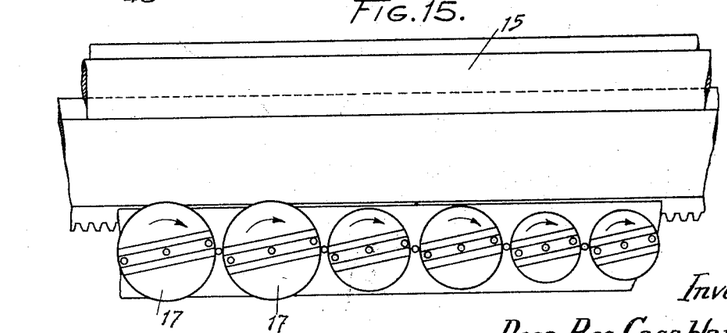

The revolving heads 17 which impart the twist in a single direction have, in their lower half, the shape of an inverted truncated cone prolonged at its lower end in a hollow cylinder 32 having at its periphery a toothed crown 33, this cylindrical extension 32 constituting the revolving shaft of the head. The conical trunk or stem forms at the edge corresponding to its greater basis a projecting rim 34 with two diametrally opposed holes 35 adjacent to the two convergent channels placed in a prominence 37 of the head. Adjoining the lesser base of the conic trunk the head has two other holes 38 diametrally opposite and corresponding to the holes 35 in the upper part, said holes 38 having outlet in the inside of the hollow cylinder 32.

Finally, the head presents an axial hole which crosses it entirely, this hole being only utilized when a netting is manufactured with strengthening straight wires, in order to pass these straight wires which are to be fastened or caught by the twist of the wires forming the hexagonal meshes, which pass through the holes 38 and 35.

These heads 17 bear through their revolving shaft 32 in holes in ruler 15 which act as bearings and are simultaneously moved by a running rack 39 having a reciprocating movement, on this ruler.

Each couple of wires which, by twist, are to form the hexagonal mesh, penetrates into the head by the inside of its revolving axis, both wires emerge separately from holes 38, then pass through holes 35, and on receiving twist through the revolving motion of the heads, become lodged in the converging slots 36 which give them the true inclination for the formation of the angle corresponding to the hexagonal mesh.

Whilst this twist is being given in a single direction, the ruler 15 which carries the heads together with the bar 17 which serves as its support, slightly lowers itself in order to leave the necessary space for the spiral windings which are being formed.

The slotted pinions 40 mounted as stated on ruler 16 act for imparting the twist in both directions. These pinions 40 are moved at the proper moment, by a rack 41, which slides in a running guide forming ruler 16. This ruler 16 has an alternate horizontal forward and backward motion in order to catch by the slots 42 of the pinions, the wires coming from the lower heads, for which, to insure the entry of the wires to be twisted together, ruler 16 forms a series of points 44 which guide the wires towards the slots. Under these points 44 the ruler forms a series of projections 45 of a triangular section, which serve as a guide to the wires subject to twist, leaving them with the proper tilt in order to form the mesh. Ruler 16 which carries the twisting pinions 40 is fixed to a support 46, horizontally sliding on guide 47 and actioned with an alternative motion by the transmission mechanisms of the machine.

The projections 45 as well as the points 44 of the ruler 16 are slotted at 48 to allow of the passage of the rectilinear wires when wire netting is manufactured provided with strengthening wires.

The distance between the consecutive organs of twisting, both in heads 17 of the lower ruler and in the slotted pinions 40 of the upper ruler, is not uniform from one end of the ruler to the other, but varies in the same proportion as has to vary in every horizontal row the width of the meshes of the netting.

The machine (Figs. 3 to 10) is provided with the corresponding driving pulley 50' fixed to, an axle 50 which, by means of speed-reducing gearings actuates the chief longitudinal shaft 28 upon which are fixed several cams which move part of the chief mechanisms of the machine. Said longitudinal shaft 28 in its turn, imparts motion, by means of bevel gearings 52 to a transversal shaft 53 which, by means of transmission devices, to be explained later, actuates the racks which revolve the twisting mechanism.

The balance-beam 23 which actions the tension rollers 9 and 12, of either feeding mechanisms, receives motion, as stated above, by means of arms 25 fixed to the balance-beam, moved by several cams 27 mounted on the main shaft 28 of the machine.

Ruler 15 which bears heads 17 which impart twist in a single direction, receives with beam 49 to which it is joined, a slight movement of descent, whilst heads 17 revolve, with the object that at every movement there is between the upper part of these heads 17 and the salients of triangular section of the upper ruler, the distance corresponding to the number of twists given to the two wires passed through the holes of the head. This beam 49 slides vertically on guides 49' of the frame of the machine, and is mounted at both ends upon vertical connecting-rods 51 pivotally connected to arms 55', 55', oscillating on the frame of the machine; the arm 55' being extended and engaging, by a terminal roller 51', upon a cam 54 mounted upon the main shaft 28.

Ruler 16 carrying the slotted pinions which give the twist in both directions, has a motion from back to forward, in order to introduce into the slots of the pinions the wires to be twisted and from forward to back, to separate from the meshes when these are once formed, so that the wire netting may rise. To this effect ruler 16 has its support 46 which slides on the fixed horizontal guide 47 articulated at 54 to an oscillating lever 56 which oscillates on an axle situated at the upper part of the frame and ends below at a roller 56'' engaging an eccentric groove 57 formed in the front part of cam 54.

The racks 39 and 41 which, respectively, revolve heads 17 and slotted pinions 40 receive alternate motion from the transversal motor shaft 53 of the machine upon which is mounted a disk 58. The disk presents on its front a salient 59 with a cam outline which, when the disk revolves actuates successively on two rollers 60, 61 a connecting member 62 (shaped like a frame so as to be able to be crossed by the shaft 53) pivoted at one end to arm 63 oscillating on a fixed shaft 64 at the upper part of the frame of the machine, and at its other end to an intermediate point of a lever 65 oscillating upon the lower fixed axle 66. This lever 65 is jointed at its other end to a clamp 67 fixed to a longitudinal sliding bar 68 and joined by means of the slotted joint 69 to the rack 41 which revolves the pinions 40 which give the twist in both directions.

Disk 58 presents at the back another cam salient 70 which, in a similar manner acts on the rollers 71, 72 of another connecting member 73 of the same shape as described and whose respective lever 74 is joined at its upper end to a clamp 75 fixed on a sliding bar 76 which actions the rack 39 imparting motion to the revolving heads 17. This motion is transmitted by a connecting rod 77 with universal joints which allows the motion from forward to back and vice-versa of the ruler 15 on which said rack 39 slides.

The motions of rulers 18, 19 which cause the wire-netting to rise periodically, are obtained by the following transmitting mechanisms.

Ruler 18 has a double swaying motion so as to catch the meshes of the wire netting or separate from them timely and at the same time a rising motion to raise the wire netting, and a lowering motion so as to return to the primitive position after having retreated from the meshes, whilst ruler 19 has no other mission than to hold the wire netting in its proper position.

Ruler 18 is mounted on a stem 78 sliding on supports 79 fixed on a longitudinal axle 80 carrying at its end an arm 81 which, by means of a connecting rod 82 is connected to a lever parallelogram 83, 84 actioned by a cam 85 fixed to axle 28. This cam conveniently produces the oscillation of support 79 and ruler 18.

The rising and lowering motion of ruler 18 is obtained by means of connecting rods 86 jointed to said ruler 18 and to levers 87 which, at their free end are, in their turn, jointed by connecting rods 88 to lower arms 89 actioned by cams 90.

Ruler 19 is mounted on arms 91 fixed on to the longitudinal axle 92 and this axle, at one end carries an arm 93 which, by a connecting-rod 94 is connected to a lever parallelogram 95, 96 actioned by a cam 100 also mounted on axle 28.

Finally, cam 90 actions a balance-beam 97 jointed to connecting rod 98 which actions a set of pawls 99 which periodically impart motion to folder 22 which rolls the manufactured wire netting.

Figure 11:
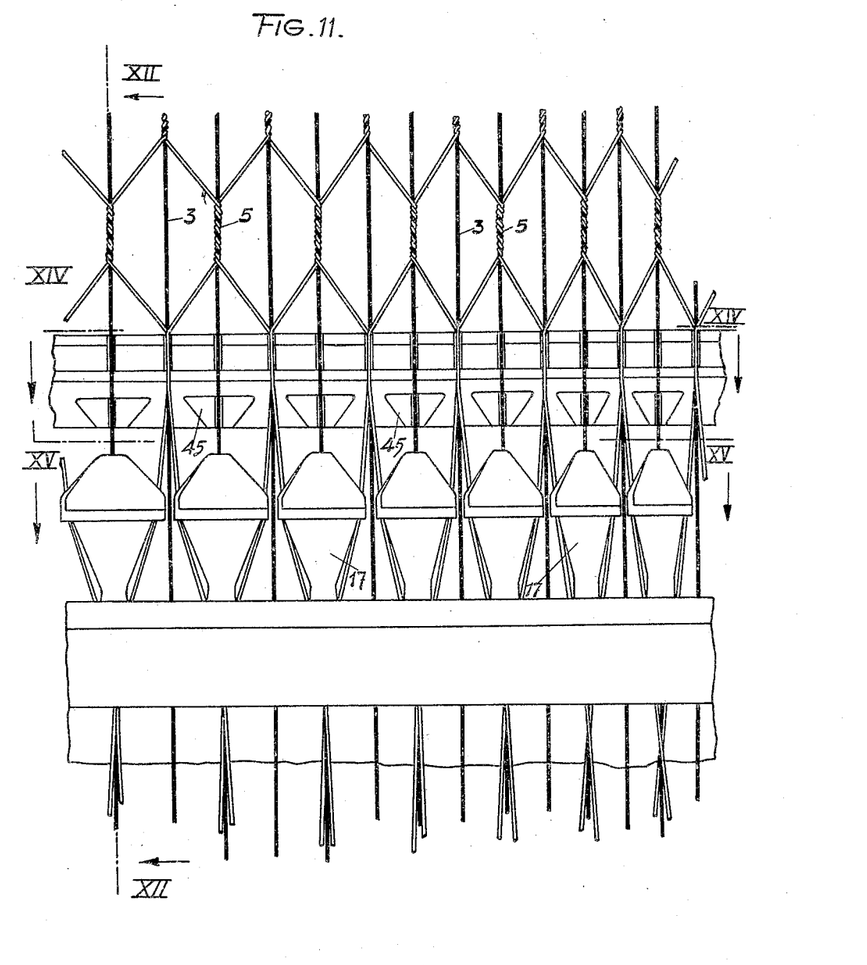
Fig. 11 is a detail on a larger scale relative to the working of the twisting pinions as seen from the front of the machine.

The wires destined to form the hexagonal meshes are passed, before starting the machine from the guiding roller 11, to the revolving heads 17 introducing them, two at a time, through the inside of the hollow revolving axle of these heads, bringing them out separately by the diametrally opposite holes of the heads and then passing them, one of each head joined to the one next of the following head, by the slots of the pinions, as shown in Fig. 11. For this, with the help of a hand-wheel 101 fixed on to the driving shaft 50 the racks are initially situated at the extreme point of their run, in which position the slots of the respective rulers, after which the hand-wheel 101 is moved in order to impart to the couple of passed wires an initial twist equal to half the total twist which the revolving heads have to give at each period.

If, for example, each junction of wire twisted in the same direction includes four spires which would be obtained by four turns, two initial turns of the wires in the opposite direction are first given thereto prior to the arrival of the wires to the twisting heads. Because of this, the wire pairs may have at the most, but two turns of twist, which in turn means that this initial twist is sufficiently unobstructive to prevent its impeding the sliding of the wires towards the twisting mechanism.

I claim:—

1. A machine for the manufacture of wire netting with hexagonal meshes of variable width, with or without longitudinal strengthening wires, including the combination of two horizontal rulers situated in the front of the machine, one above the other, of which the lower one carries a series of revolving heads which receive the wires from a feeding and tension mechanism and twist them, two at a time, forming a horizontal row of meshes, and the higher ruler carries a series of slotted pinions which impart to the wires a twist in both directions, forming a second row of meshes, these twisting means of both series being distributed upon their respective rulers in such manner that the distance separating two consecutive means, as well as the thickness or diameter of the revolving heads varies in the same proportion as determined by the desired width of the meshes of wire netting.

2. A machine, according to claim 1, in which the tension and feeding mechanism is composed of two sets of rollers, one of which is adapted to receive the wires which are to be subjected to twist and form the hexagonal mesh, and the other to receive the longitudinal strengthening wires, each set comprising a tensor roller and guide rollers which periodically deliver to the twisting heads the necessary length of wire to form the rows of meshes, maintaining them tense during the twisting, a cam, and a balance beam movable thereby; the tensor rollers of both sets being simultaneously actioned by said balance beam, the drive shaft of the machine serving to operate said members.

3. A machine according to claim 1, wherein the revolving heads which produce a twist in one direction only have the form of an inverted cone stem and presenting at their upper portions a projection modified by a pair of converging grooves adapted to guide the wires, the diameter of said revolving heads and the angle formed by said grooves corresponding to the variable width of the wire meshes.

4. A machine according to claim 1, wherein triangular projections are provided adjacent to the slotted pinions which produce the twist in both directions, in order to guide the wires while the meshes are being formed, the width of said projections and the incline of their lateral faces varying to correspond with the variations in the width of the wire meshes.

5. A machine according to claim 1, provided with two rulers having several points disposed thereon and spaced at various distances apart to correspond with the variations in the width of the wire meshes produced by the machine, and means causing said points to enter the meshes and upon each entry therein to raise the wire netting as a whole a space equivalent to the distance occupied by two horizontal rows of meshes.

In testimony whereof I affix my signature.

ROSA ROS CASABLANCAS.